US009967814B2

(12) United States Patent
Ekici et al.

(10) Patent No.: US 9,967,814 B2
(45) Date of Patent: May 8, 2018

(54) AUTOMATIC TRACKING OF MOBILE DEVICE CAMPING FAILURE TO AN ACCESS POINT

(75) Inventors: Ozgur Ekici, Escondido, CA (US); Muhammad Khaledul Islam, Ottawa (CA); Andrew John Farnsworth, Kidderminster (GB); Vaibhav Singh, Birmingham (GB)

(73) Assignee: BlackBerry Limited, Waterloo, Ontario (CA)

( * ) Notice: Subject to any disclaimer, the term of this patent is extended or adjusted under 35 U.S.C. 154(b) by 511 days.

(21) Appl. No.: 13/523,313

(22) Filed: Jun. 14, 2012

(65) Prior Publication Data

US 2013/0337799 A1 Dec. 19, 2013

(51) Int. Cl.
*H04W 24/00* (2009.01)
*H04W 48/20* (2009.01)
*H04W 8/18* (2009.01)
*H04W 36/00* (2009.01)

(52) U.S. Cl.
CPC .............. *H04W 48/20* (2013.01); *H04W 8/18* (2013.01); *H04W 36/0066* (2013.01); *H04W 36/0083* (2013.01)

(58) Field of Classification Search
CPC ....... H04W 24/00; H04W 48/20; H04W 8/18; H04W 36/0083; H04W 36/0066; H04W 72/04; H04W 72/02; H04W 4/00; H04W 36/00; H04W 48/02; H04W 36/20; H04W 36/08
USPC .......... 455/434, 435.2, 435.3, 436–444, 512, 455/513, 525, 423
See application file for complete search history.

(56) References Cited

U.S. PATENT DOCUMENTS

| 5,398,258 A * | 3/1995 | Su .......................... H03M 5/145 370/277 |
| 5,729,531 A * | 3/1998 | Raith ................ H04W 72/0486 370/252 |
| 6,304,756 B1 * | 10/2001 | Hebeler ................ H04W 36/06 455/434 |
| 7,483,702 B2 * | 1/2009 | Yeo et al. ...................... 455/449 |
| 2003/0203735 A1 * | 10/2003 | Andrus ................ H04W 36/30 455/450 |
| 2006/0178153 A1 * | 8/2006 | Tenny ................... H04W 48/20 455/450 |
| 2009/0221287 A1 * | 9/2009 | Balasubramanian et al. ............................. 455/434 |

(Continued)

FOREIGN PATENT DOCUMENTS

| EP | 2675220 | 6/2012 |
| WO | 00/07383 A2 | 2/2000 |
| WO | 02/37875 A1 | 5/2002 |

OTHER PUBLICATIONS

3rd Generation Partnership Project "UE Procedures in Idle Mode and Procedures for Cell Reselection in Connected Mode (Release 4)", 2001-03.*

(Continued)

*Primary Examiner* — Mehmood B. Khan
*Assistant Examiner* — Sayed T Zewari
(74) *Attorney, Agent, or Firm* — Thomas Grzesik; Fleit Gibbons Gutman Bongini & Bianco P.L.

(57) ABSTRACT

A method and apparatus for a device in which when an attempt on a frequency to camp on a cell fails, there is an indication stored in relation to the frequency of the failed camping attempt.

30 Claims, 6 Drawing Sheets

(56) References Cited

U.S. PATENT DOCUMENTS

| | | | |
|---|---|---|---|
| 2009/0264133 A1* | 10/2009 | Lee | H04W 72/005 |
| | | | 455/436 |
| 2010/0035615 A1* | 2/2010 | Kitazoe et al. | 455/436 |
| 2010/0203865 A1* | 8/2010 | Horn et al. | 455/411 |
| 2011/0117916 A1* | 5/2011 | Dahlen | 455/436 |
| 2011/0117951 A1* | 5/2011 | Lee | H04W 72/02 |
| | | | 455/513 |
| 2012/0100846 A1* | 4/2012 | Saini et al. | 455/424 |
| 2013/0337799 A1 | 12/2013 | Ekici et al. | |

OTHER PUBLICATIONS

Extended European Search Report from related European Patent Application No. 12172022.1 dated Nov. 15, 2012; 7 pages.
European Examination Report dated Jul. 18, 2016, received for European Application No. 12172022.1.
3GPP TR 36.805 V1.3.1, "3rd Generation Partnership Project; Technical Specification Group Radio Access Network; Study on Minimization of drive-tests in Next Generation Networks; (Release 9)", Nov. 2009, pp. 1-24.
3GPP TSG RAN WG2 Meeting #60 bis, "Reception of the system information type 5bis", Jan. 2008, pp. 1-10.
Canadian Office Action dated Oct. 4, 2016, received for Canadian Application No. 2,813,959.
Canadian Office Action dated Jul. 28, 2017 issued for Canadian Application No. 2,813,959.

* cited by examiner

AUTOMATIC TRACKING OF MOBILE DEVICE CAMPING FAILURE TO AN ACCESS POINT

BACKGROUND TECHNICAL FIELD

This application relates to a method and apparatus in a device. In particular, the application relates to a method and apparatus in a device in a telecommunication system.

DESCRIPTION OF THE RELATED ART

In a typical wireless cellular radio system, user equipment (UE), or a 'device', communicates via one or more radio access networks (RANs) to one or more core networks. User equipment (UE) comprises various types of equipment such as mobile telephones (also known as cellular or cell phones, including smart phones), laptops with wireless communication capability, personal digital assistants (PDAs) etc. These may be portable, hand held, pocket sized, installed in a vehicle etc., and communicate voice and/or data signals with the radio access network.

W-CDMA (Wideband Code Division Multiple Access) is a radio interface approved by ITU (International Telecommunications Union) for $3^{rd}$ generation IMT-2000 (International Mobile Telecommunication-2000) technology, for use in a wireless mobile telecommunication system. The $3^{rd}$ Generation Partnership Project (3GPP) defined UMTS (Universal Mobile Telecommunication System) which is based on WCDMA air interface.

In the following, reference may be made to E-UTRAN (e.g. LTE), UTRAN (e.g. UMTS) and GERAN. Various standardization bodies are known to publish specifications/ standards and set standards for mobile telecommunication systems. For instance, the 3GPP (Third Generation Partnership Project) has been known to publish specifications/ standards and/or set standards for mobile telecommunications such as UMTS. Reference will be made here to particular "Standards". However it should be understood there is no limitation to any particular mobile telecommunications system.

A typical radio access network covers a geographical area typically having a plurality of cell areas. Each cell area is served by at least one base station, which in UMTS and LTE may be referred to as a Node B and enhanced-Node B (eNB) respectively. The base stations communicate at radio frequencies over an air interface with the UEs within range of the base stations. Several base stations may be connected to a radio network controller (RNC), in UTRAN systems, which controls various activities of the base stations. The radio network controllers are typically connected to a core network.

A dedicated physical channel (DPCH) for downlink and uplink has been defined in Standard releases. High speed packet access (HSPA) protocols have been defined to improve the performance of transport channels, i.e. to increase capacity and throughout and reduce delay.

HSPA is an amalgamation of two mobile telephony protocols, High Speed Downlink Packet Access (HSDPA) and High Speed Uplink Packet Access (HSUPA), that extend and improves the performance of existing W-CDMA protocols. HSUPA uses an uplink enhanced dedicated channel (E-DCH) on which it employs link adaptation methods similar to those employed by High-Speed Downlink Packet Access (HSDPA). A further 3GPP Standard is Evolved HSPA (also known as HSPA+).

In some networks, such as some commercial HSPA networks, the network operators choose to allocate separate frequencies for connected (CONN) and IDLE mode operations. Similar allocations can be performed between DPCH operation for circuit switched services such as voice or packet-switched services versus HSPA operations (like HSDPA and E-DCH) for packet-switched services.

There are multiple motivations for assigning different frequencies for CONN and IDLE, or HSPA and DPCH/ IDLE, mode operations. For instance, having separate frequencies for symmetric voice services and asymmetric packet switched PS services can make network planning easier. Another reason is that if HSDPA operation is kept on a separate frequency, circuit switched CS call performance can be improved since there is no inter-cell interference from HSPA services, which is especially important when a cell is serving low geometry users e.g. users at the edge of a cell. When CS call on DPCH and PS calls on HSPA occur in the same cell, then typically all the cell power that is left after serving common channels and DPCH channels is used for HSPA operation, so that cells using HSDPA can give rise to inter-cell interference.

Another motivation is that by allocating CONN specific frequencies, the network can reduce downlink interference on the considered frequency by not configuring common channels like Secondary Common Control channel (SC-CPCH). Also, since Primary Control Channel (PCCPCH) on CONN frequency typically broadcasts only a Master Information Block (MIB) or MIB and only System Information Block 3 (SIB3) instead of all SIBs, then most of the PCCPCH is filled with no segment rather than SIB data, thus the transmission power level of PCCPCH is reduced for cells operating in CONN frequencies.

There are several ways in which a network operator can prevent the UE from attempting to select cells on CONN frequencies. For instance, they could bar the cell (in SIB3 for example). Another way would be to not allocate MIB in a position fulfilling SFN mod 32=0, but have a transport block with a valid CRC at that position (see 25.331 v10.6.0 section 8.1.1.5).

Another alternative is to omit system information (like SIB1) on PCCPCH which will cause a UE to bar the cell.

A UE may be prompted to attempt to camp on a cell on a CONN frequency for a number of reasons, for example of its own initiative, as part of a radio link failure RLF, as part of an unrecoverable RLC or PDCP error, at the request (implicit, such as in RLF, or explicit) of the network in a reconfiguration message taking UE out of CELL_DCH state, an RrcConnectionRelease message, or a message performing inter-RAT redirection to UMTS. A UE may look to camp on a cell as part of circuit-switched (CS) fallback from LTE when the network does not provide UMTS frequency information; this is an example use case for the redirection scenario.

Section 5.2.7 in Standard 25.304 v10.3.0 describes cell selection when leaving connected mode.

5.2.7 Cell Selection when Leaving Connected Mode 5.2.7.1 UTRA Case

When returning to idle mode from connected mode, the UE shall select a suitable cell to camp on. Candidate cells for this selection are the cell(s) used immediately before leaving connected mode. If no suitable cell is found, the UE shall use the stored information cell selection procedure in order to find a suitable cell to camp on. When returning to idle mode after an emergency call on any PLMN, the UE shall select an acceptable cell to camp on.

Candidate cells for this selection are the cell(s) used immediately before leaving connected mode. If no acceptable cell is found, the UE shall continue to search for an acceptable cell of any PLMN in state Any cell selection.

Thus, for example, a UE that is not properly directed by the network to a target frequency in CELL_FACH, IDLE or CELL/URA_PCH transition from CELL_DCH connected state, or if it experiences radio link failure, say, may attempt to camp on a cell of CONN frequency, and fail to do so. If the UE is making a transition from CELL_DCH, if the network has not scheduled critical information like SIB1 or MIB, the UE will be caused to bar the cell. The UE may attempt to try a different cell on the same frequency (UARFCN), and fail again to camp on the different cell.

The UE can loose considerable time (for instance, 500 ms or more) trying to find a suitable cell in scenarios such as RLF or circuit switched fallback from LTE when the network does not provide any frequencies. If the UE can not find a cell in a reasonable amount of time, the UE can even experience user perceived voice call drops (e.g. where the CellUpdate procedure cannot recover the call from radio link failure). How long it may take can depend upon how many cells there are on the CONN frequency. Whilst the UE is looking for a suitable cell to camp on, the UE can be un-reachable for network paging.

There are proposed strategies for a method and apparatus in a device. A number of such strategies are detailed below.

Other aspects and features of the proposed strategy will become apparent to those ordinarily skilled in the art upon review of the following description of specific embodiments of an apparatus and method in mobile telecommunications system user equipment.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

Figure 1:
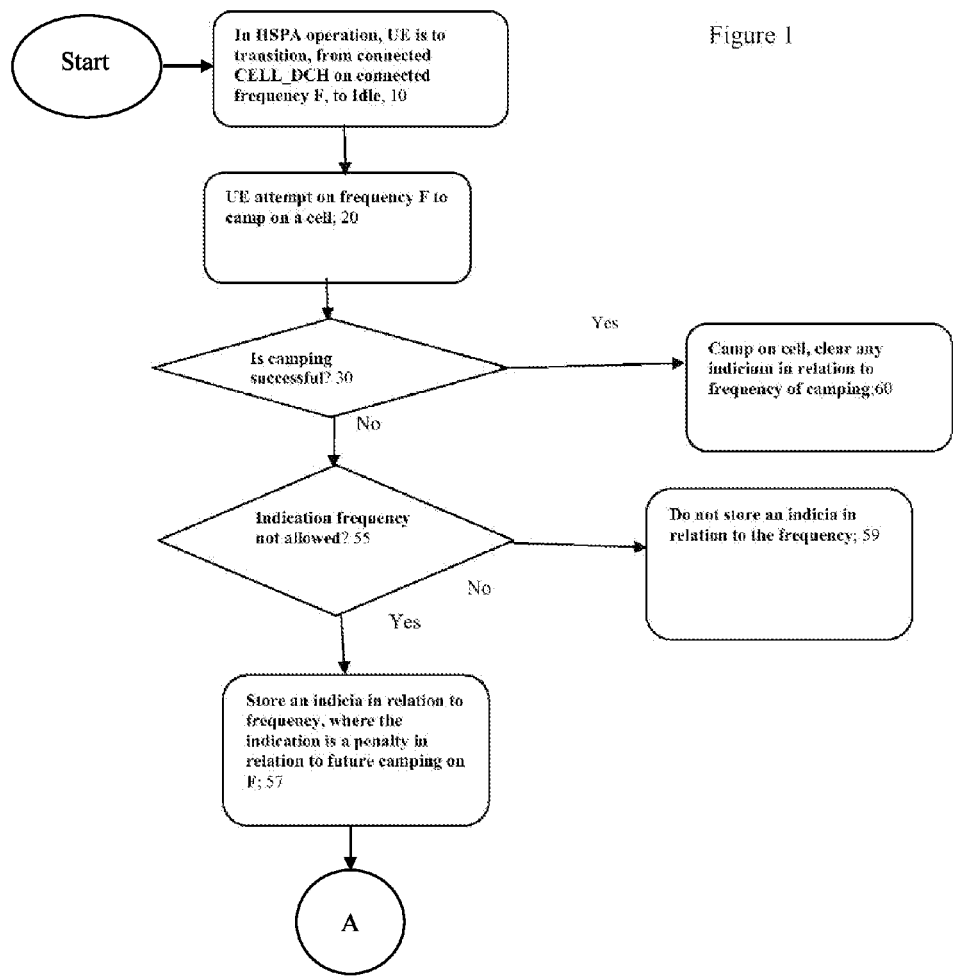
FIG. 1 illustrates a technique in mobile telecommunications system user equipment.

An apparatus and method in a device is described herein. In the following description, for the purposes of explanation, numerous specific details are set forth in order to provide a thorough understanding of the present aspects. It will be apparent, however, to one skilled in the art that the technique may be practised without these specific details. In other instances, well-known structures and devices are shown in block diagram form in order to avoid unnecessarily obscuring aspects.

The needs identified in the foregoing Background, and other needs and objects that will become apparent from the following description, are achieved by, in one aspect, a method and apparatus in a device.

In one aspect, there is a method in a device, comprising: if, on a frequency, the device: fails an attempt to camp on a cell, and identifies an indication that the frequency is not allowed for camping; marking the frequency.

Preferably, marking the frequency comprises: storing an indicium in relation to the frequency. Preferably the indicium comprises a penalty for future camping attempts on the frequency. When there are one or more different frequencies for attempting to camp on a cell, attempting to camp on a cell may be using a frequency dependent upon the indicium.

Preferably when there are one or more different frequencies for attempting to camp on a cell; and when the UE has not received information relating to a frequency of camping to use; the method comprises attempting to camp on a cell using a frequency dependent upon the indicium. Preferably attempting to camp on the cell comprises attempting to camp using one or more of the different frequencies in preference to the frequency. Preferably the method comprises attempting to camp using a different frequency for a period.

The indicium may comprise an indication of information received by the device that the cell is barred for camping; or a failure to receive information required for camping on the cell.

Preferably the method further comprises storing the indicium in a frequency table. Preferably when the UE camps on a cell on a frequency with a related indicium, the method includes removing the indicium. Preferably the device is operable in a High Speed Packet Access network in which separate frequencies are allocated for connected mode operation, and idle mode operation.

Preferably the device can be in a connected mode, and attempt to camp on the cell as part of a transition to an idle mode. The device may attempt to camp on a cell as part of: radio link failure; re-direction to circuit switched operation from LTE operation on direction of a network in which the device is operable, without the network indicating a frequency for the circuit switched operation; in GERAN operation where a list of frequencies provided to the device for cell reselection or cell change does not indicate which of the frequencies are for connected or idle mode operation.

Preferably the attempt to camp on the cell may be part of an inter-RAT, or an intra-RAT transition.

There is also provided a wireless telecommunications device comprising: a processor; and a memory having stored therein one or more routines executable by the processor, the one or more routines being adapted to operate according to the method described.

There is also provided a computer-readable medium having computer-executable instructions adapted to cause a device to perform the method described.

Overview

The present approach is concerned with scenarios where a UE attempts to camp on a cell on a frequency and fails, because it is transitioning to non connected mode (or non CELL_DCH) operation and the frequency being used for camping is allocated for connected mode (or CELL_DCH). The UE may then try to camp on another cell of the same connected frequency, and again fail. In the case of radio link failure, the UE may repeatedly attempt to camp on cells on connected frequencies and fail cell selection. In scenarios like this radio link failure, and also for CS fallback from LTE when the network does not provide UMTS frequencies, there is a significant delay for UEs trying to find a suitable cell to camp on.

In the present approach, when a camping attempt fails, the UE is arranged to "remember" the frequency on which the failed attempt occurred such that this information can be used by the UE later in further camping attempts. For instance, the frequency is stored with an indication ("indicium") such as a penalty, that is used as a discouraging factor for selecting that frequency in preference to others in future camping attempts. The reason for failing to camp may be used to decide whether to penalise the frequency in this way.

The present approach is thus a method and apparatus of frequency tagging to accelerate, for example, cell selections.

Example 1

According to example 1, in summary, a stored frequency of a failed camping attempt is indicated as "penalised", so that in future camping attempts, a UE will first try frequencies not marked as penalised in preference.

FIG. 1 illustrates the approach of example 1, where a UE is in HSPA operation. The frequencies, for connected mode in this HSPA operation are separate to that of IDLE mode operation. In another aspect, the UE is in a HSPA operation such as HSDPA and E-DCH and there is a similar allocation of frequencies for DPCH circuit-switched such as voice, or packet-switched services; or the UE is in non HSPA operation.

The UE is in a connected mode state, CELL_DCH, on a CONN frequency, and is prompted to transition out of this state, in step 10. In this example, the UE is not otherwise directed by the network to a target frequency that is allowed for camping. In another aspect, the UE may be directed to a target frequency that is allowed for camping. The UE is requested by the network to undergo a transition in this example. In another aspect, the transition may be initiated in other ways, for instance by the UE, or as part of a RLF. In another aspect, the UE is undergoing another type of UE initiated exit from CELL_DCH such as Unrecoverable RLC or PDCP error. Another aspect this example is applicable to is exiting from CELL_DCH under UTRAN re-direction, when the UTRAN is not properly configured.

In this example, the transition is from CELL_DCH to IDLE. However, the transition may alternatively be between connected modes e.g. CELL_DCH to CELL_FACH, CELL_PCH, or URA_PCH. In this example the transition is intra-RAT, although in another aspect, the example extends to inter-RAT transitions.

In step 20, the UE attempts to camp on a cell. The UE uses a list of candidate frequencies in one aspect, for instance, based on RSSI of supported frequencies. In the present example, from these possible candidates, the UE attempts to camp on a cell of the same frequency that it was previously on when in CELL_DCH. If the attempt is successful, the UE camps on the cell in step 60.

In step 60, camping is successful. The UE, in this example, clears any indicia that are stored in relation to the frequency of the camping.

If camping is not successful, then the UE moves to step 55. Failure to camp may be for one or more of a number of reasons. In this example, the network has explicitly barred the cell in SIB 3 to prevent the UE to attempt to select a cell on CONN frequency. In another example, the network may try to achieve this by omitting SIB1 on PCCPCH so that the cell is barred by the UE.

In step 55, the UE determines if there is an indication that camping on the frequency is not allowed. For instance, this may be omission of a system information bock such as SIB1, by an indication in SIB3 say that the cell is explicitly barred and camping on other cells on that frequency is not allowed when this cell is the strongest cell, by a failure to allocate a master information block in a position fulfilling SFN mod 32=0, or by an indication in an information element.

In 57, when the camping attempt is not successful, and there is an indication the frequency is not allowed, then the UE marks the frequency, here by storing an indicium/indication with respect to the frequency. In this aspect, the UE indicates the frequency as "penalised", so that as described below, other frequencies are tried in preference in future camping attempts.

In 59, when the camping attempt is not successful, and there is no indication that the frequency is not allowed, then the UE does not store an indicium with respect to the frequency. Examples that would not be considered an indication of a frequency not allowed would be where a cell does not satisfy the cell selection criterion S.

Figure 2:
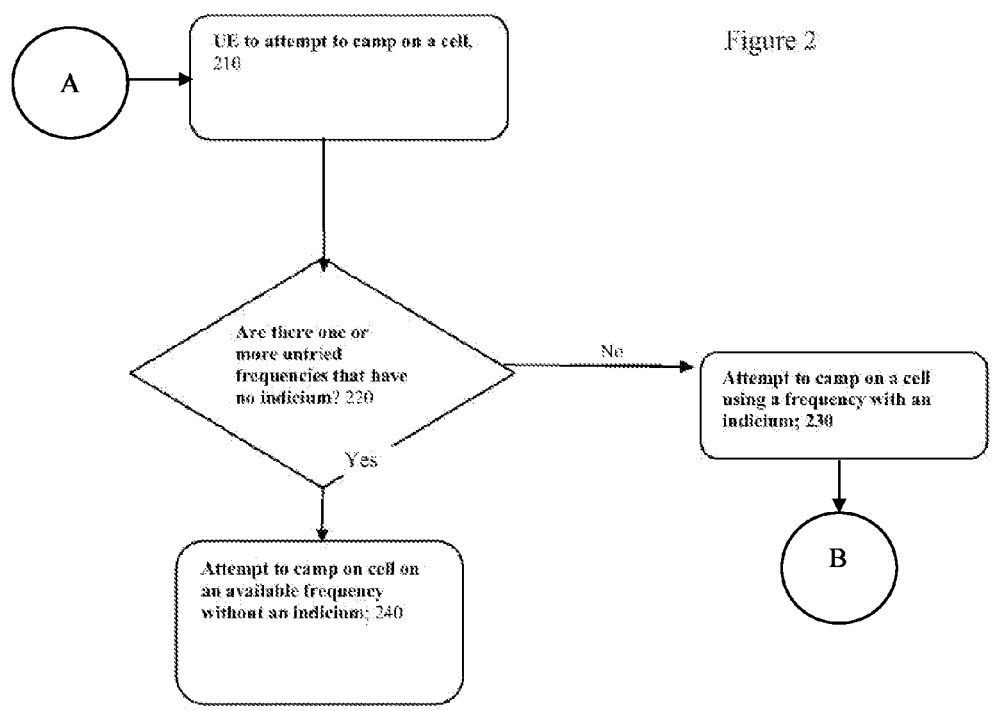
FIG. 2 illustrates a technique in mobile telecommunications system user equipment.

FIG. 2 illustrates the method of this example for future camping attempts of the UE for which one or more a frequencies are marked as penalised, following a failed camping attempt on a frequency. This aspect is a case of general cell selection, where the UE can camp on any cell that is suitable. In another example, the UE will try to camp on a specific cell or on a specific frequency.

In step 210, a UE attempts to camp on a cell on a frequency, where the frequency may, or may not, have been specified by the UTRAN (i.e. there may, or may not, have been a "Frequency info" IE in a message from the UTRAN). In one aspect, the present example is only applicable when the UE has not received an indication from the UTRAN of what frequency to use.

In step 220, there is a determination of whether there is an untried frequency to attempt camping on that is not a penalized frequency. The UE in this example looks to see if there is an indicium stored in relation to an available frequency. A frequency is considered to be penalised if it is marked as "penalised for RLF or interRAT cell selection", in one example. The UE has thus flagged the frequency with a penalty, where the frequency is a CONN frequency.

If there are no untried frequencies not penalised, then the UE in 230 looks on a penalized frequency for a cell on which the UE can camp.

If there are one or more untried frequencies available that are not penalized frequencies, then in 240 the UE tries such an un-penalized frequency first in preference to a penalised frequency. There are thus two cases:

1) where all frequencies without indicium have already been checked, but there are frequencies with indicium, and these will be tried.
2) there are no frequencies that haven't been checked—in this case, cell selection fails.

In this way, according to this example, the UE effectively "remembers" frequencies on which camping attempts have failed in a way indicative that the frequency might not ever allow camping.

Thus, according to this example, there is acceleration of cell selection during IDLE mode transition.

Figure 3:
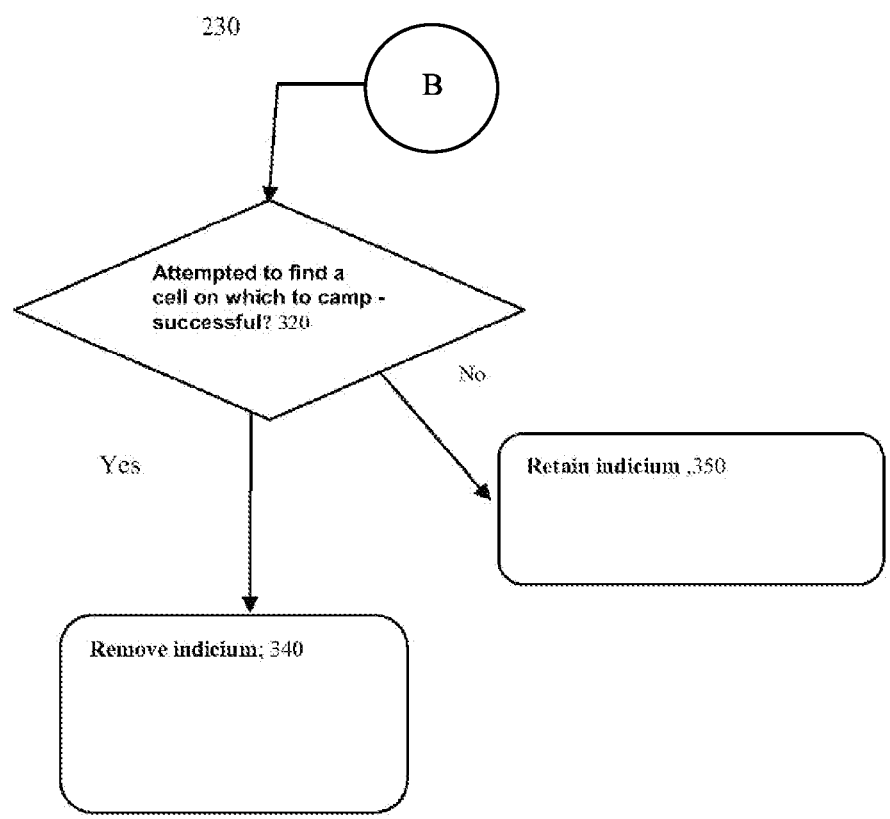
FIG. 3 illustrates a technique in mobile telecommunications system user equipment.

FIG. 3 illustrates the case where following on from step 230 in FIG. 2, the UE is attempting to find a camp on which to camp where there are no untried frequencies not penalised, by looking on a penalized frequency. In step 320, the UE's attempts to find a cell on which to camp is successful or unsuccessful.

If it is successful, then in 340, then the indication of a penalty is removed from storage. In another aspect, on camping on the frequency, the penalty may be removed for a period of time, or be allocated a changed importance level so that the frequency is chosen in preference to other frequencies to a different degree. If camping on is not successful, then in 350, the penalty is retained.

It is noted that following steps 240, 350, 57, 59, 230 and 240; in one aspect of Cell Selection, the method described will continue until the UE is camped on a cell successfully, or the UE stops attempting to camp on a cell (Cell Selection failure).

In an alternative aspect to this example, the penalty is "graded" such that penalising the frequency for a period measured in terms of time or activity of the UE and/or network. Alternatively, the penalty may be graded so that the frequency in question is not chosen as a preferred frequency to try, but may be chosen in preference to another possible frequency.

The present example can be applicable in several problematic scenarios that include:

Radio link failure

CS fallback from LTE where the UE is directed to UTRAN without specific frequency information Cell reselection or cell change order from GERAN where the list of UARFCNs are presented to UE without any further information of whether the frequencies are for CONN or IDLE mode operations In the case of GERAN, where UTRAN frequencies are presented in a list in SYSTEM INFORMATION TYPE 2quater, and where the UE knows which frequency is allocated for UTRAN IDLE mode operation, then in GERAN stand-by-mode, the UE can perform measurements only on UTRAN IDLE frequencies. This present approach will accelerate the measurements and reduce battery consumption in GERAN mode of operation.

The benefits of the present example include reduced time to camp on cells and improved battery life.

Figure 4:
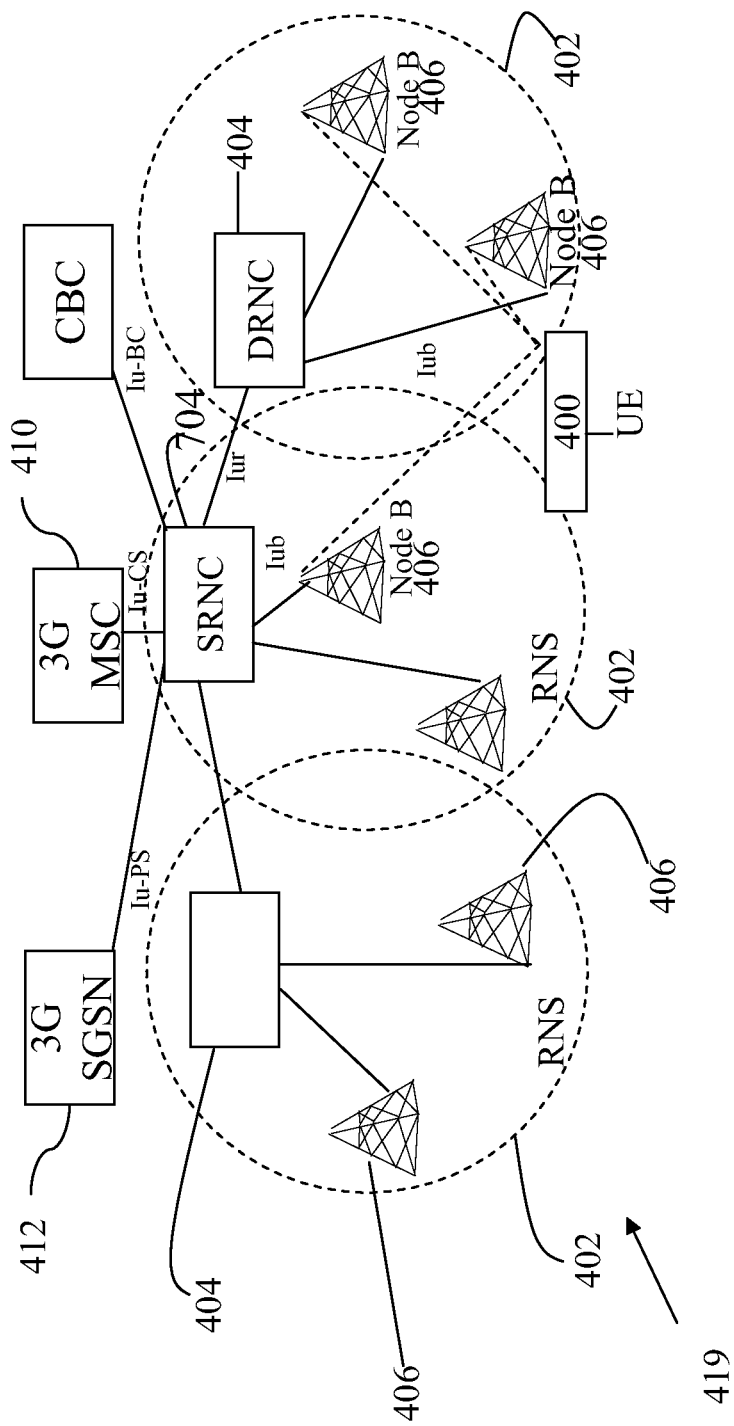
FIG. 4 shows an overview of a network and a user equipment device.

FIG. 4 shows an overview of a network and a UE device. Clearly in practice there may be many UE devices operating with the network but, for the sake of simplicity, FIG. 4 only shows a single UE device 400. For the purposes of illustration, FIG. 4 also shows a network 419 having a few components. It will be clear to a person skilled in the art that in practice a network will include far more components than those shown.

FIG. 4 shows an overview of the radio access network 419 (e.g. E-UTRAN) used in a mobile communications system. The network 419 as shown in FIG. 4 comprises three Radio Network Subsystems (RNS) 2. Each RNS has a Radio Network Controller (RNC) 4. Each RNS 4 has one or more Node B 6 which are similar in function to a Base Transmitter Station of a GSM radio access network. User Equipment UE 400 may be mobile within the radio access network. Radio connections (indicated by the straight dotted lines in FIG. 4) are established between the UE and one or more of the Node Bs in the network 419.

The radio network controller controls the use and reliability of the radio resources within the RNS 2. Each RNC may also connected to a 3G mobile switching centre 40 (3G MSC) and a 3G serving GPRS support node 42 (3G SGSN).

Figure 5:
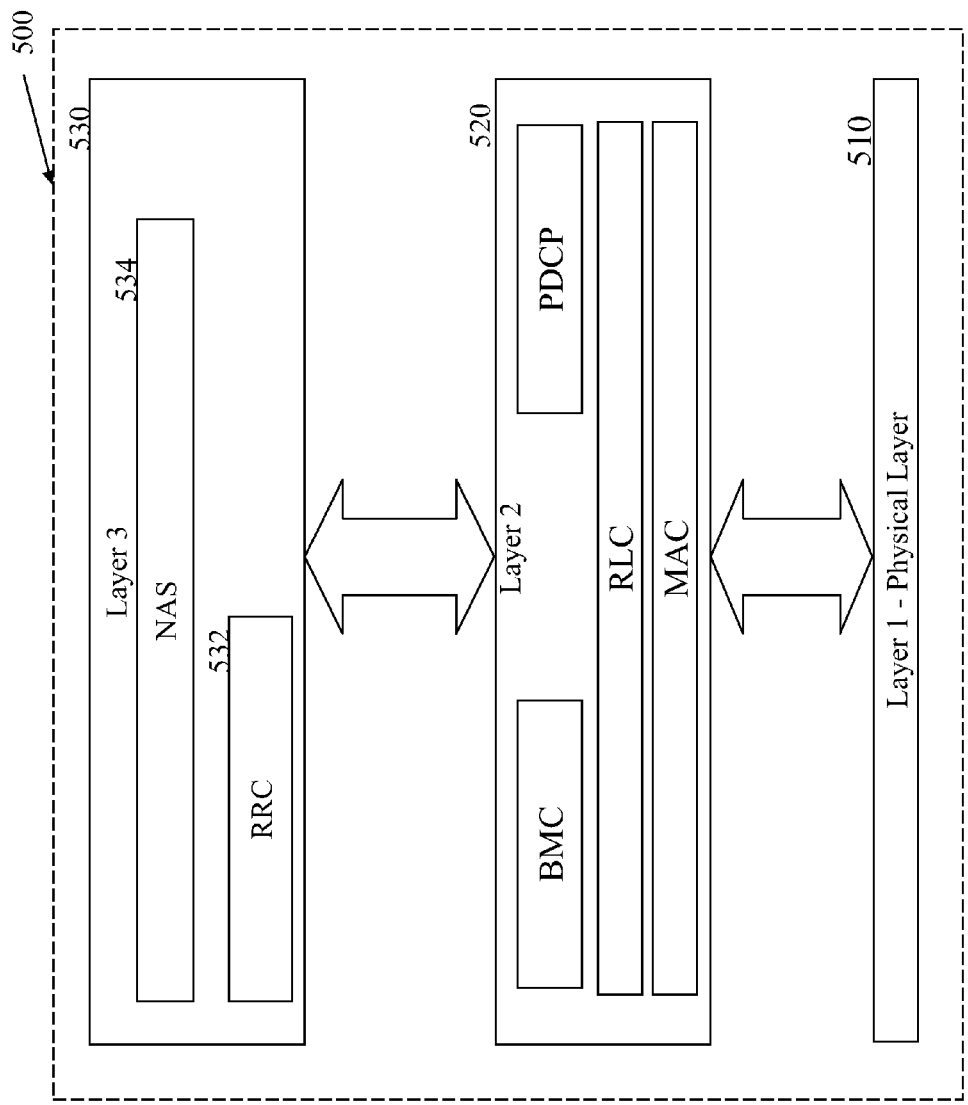
FIG. 5 is a block diagram illustrating an embodiment of a protocol stack apparatus provided with a RRC block, in accordance with the present application.

FIG. 5 is a block diagram illustrating an embodiment of a protocol stack provided in a UE. A Radio Resource Controller (RRC) block 532 is a sub layer of Layer 3 530 of a protocol stack 500. The RRC 532 exists in the control plane only and provides an information transfer service to the non-access stratum NAS 534. The RRC 532 is responsible for controlling the configuration of radio interface Layer 1 510 and Layer 2 520. When the network wishes to change the UE configuration it will issue a message to the UE containing a command to invoke a specific RRC procedure. The RRC layer 532 of the UE decodes this message and initiates the appropriate RRC procedure. Generally when the procedure has been completed (either successfully or not) then the RRC sends a response message to the network (via the lower layers) informing the network of the outcome. It should be noted that there are a few scenarios where the RRC will not issue a response message to the network and, in those cases the RRC need not and does not reply.

The strategies in mobile telecommunications system user equipment as discussed above with reference to the drawings may be implemented by the RRC block 532.

Figure 6:
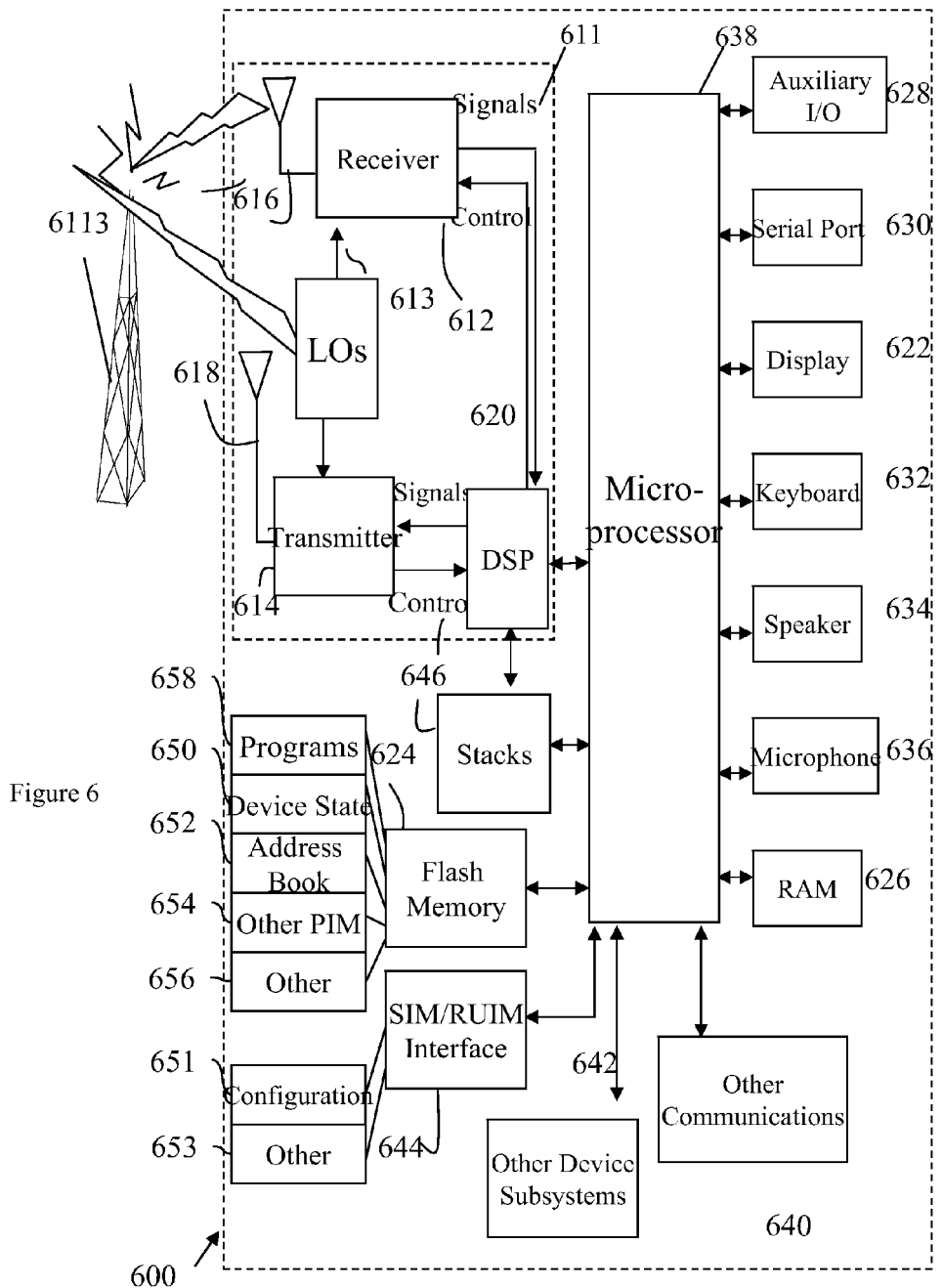
FIG. 6 is a block diagram illustrating a mobile device, which can act as a UE and co-operate with the apparatus and method of FIGS. 1-3.

Turning now to FIG. 6, FIG. 6 is a block diagram illustrating a mobile device, which can act as a UE and co-operate with the apparatus and method of FIG. 1, and which is an exemplary wireless communication device. Mobile station 600 is preferably a two-way wireless communication device having at least voice and data communication capabilities. Mobile station 600 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 600 is enabled for two-way communication, it will incorporate a communication subsystem 611, including both a receiver 612 and a transmitter 614, as well as associated components such as one or more, preferably embedded or internal, antenna elements 616 and 616, local oscillators (LOs) 613, and processing means such as a processing module such as a digital signal processor (DSP) 620. As will be apparent to those skilled in the field of communications, the particular design of the communication subsystem 611 will be dependent upon the communication network in which the device is intended to operate. For example, mobile station 600 may include a communication subsystem 611 designed to operate within the Mobitex™ mobile communication system, the DataTAC™ mobile communication system, GPRS network, UMTS network, EDGE network, LTE network etc.

Network access requirements will also vary depending upon the type of network 602. For example, in the Mobitex and DataTAC networks, mobile station 600 is registered on the network using a unique identification number associated with each mobile station. In UMTS and GPRS networks, however, network access is associated with a subscriber or user of mobile station 600. A UMTS/GPRS mobile station therefore requires a subscriber identity module (SIM) card or a universal subscriber identity module (USIM) card in order to get service as per subscription. Without a valid SIM/USIM card, a UMTS/GPRS mobile station will not be able to get full service. Local or non-network communication functions, as well as legally required functions (if any) such as "911" emergency calling, may be available, but mobile station 600 will be unable to carry out any other non-emergency functions involving communications over the network 602. The SIM/USIM interface 644 is normally similar to a card-slot into which a SIM/USIM card can be inserted and ejected like a diskette or PCMCIA card. The SIM/USIM card has memory and may hold many key configuration 651, and other information 653 such as identification, and subscriber related information.

When required network registration or activation procedures have been completed, mobile station 600 may send and receive communication signals over the network 602. Signals received by antenna 616 through communication network 602 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 602 via antenna 616. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile station 600 preferably includes processing means such as a microprocessor 636 which controls the overall operation of the device. Communication functions, including at least data and voice communications, are performed through communication subsystem 611. Microprocessor 636 also interacts with further device subsystems such as the display 622, flash memory 624, random access memory (RAM) 626, auxiliary input/output (I/O) subsystems 626, serial port 630, keyboard 632, speaker 634, microphone 636, a short-range communications subsystem 640 and any other device subsystems generally designated as 642.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 636 is preferably stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 656 and program data storage 650, 652, 654 and 656. These different storage types indicate that each program can allocate a portion of flash memory 624 for their own data storage requirements. Microprocessor 634, in addition to its operating system functions, preferably enables execution of software applications on the mobile station. A predetermined set of applications that control basic operations, including at least data and voice communication applications for example, will normally be installed on mobile station 600 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 602. In a preferred embodiment, the PIM data items are seamlessly integrated, synchronized and updated, via the wireless network 602, with the mobile station user's corresponding data items stored or associated with a host computer system. Further applications may also be loaded onto the mobile station 600 through the network 602, an auxiliary I/O subsystem 626, serial port 630, short-range communications subsystem 640 or any other suitable subsystem 642, and installed by a user in the RAM 626 or preferably a non-volatile store (not shown) for execution by the microprocessor 636. Such flexibility in application installation increases the functionality of the device and may provide enhanced on-device functions, communication-related functions, or both. For example, secure communication applications may enable electronic commerce functions and other such financial transactions to be performed using the mobile station 600.

In a data communication mode, a received signal such as a text message or web page download will be processed by the communication subsystem 611 and input to the microprocessor 636, which preferably further processes the received signal for output to the display 622, or alternatively to an auxiliary I/O device 626. A user of mobile station 600 may also compose data items such as email messages for example, using the keyboard 632, which is preferably a complete alphanumeric keyboard or telephone-type keypad, in conjunction with the display 622 and possibly an auxiliary I/O device 626. Such composed items may then be transmitted over a communication network through the communication subsystem 611.

For voice communications, overall operation of mobile station 600 is similar, except that received signals would preferably be output to a speaker 634 and signals for transmission would be generated by a microphone 636. Alternative voice or audio I/O subsystems, such as a voice message recording subsystem, may also be implemented on mobile station 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6, would normally be implemented in a personal digital assistant (PDA)-type mobile station for which synchronization with a user's desktop computer (not shown) may be desirable, but is an optional device component. Such a port 630 would enable a user to set preferences through an external device or software application and would extend the capabilities of mobile station 600 by providing for information or software downloads to mobile station 600 other than through a wireless communication network. The alternate download path may for example be used to load an encryption key onto the device through a direct and thus reliable and trusted connection to thereby enable secure device communication.

Other communications subsystems 640, such as a short-range communications subsystem, is a further optional component which may provide for communication between mobile station 600 and different systems or devices, which need not necessarily be similar devices. For example, the subsystem 640 may include an infrared device and associated circuits and components or a Bluetooth™ communication module to provide for communication with similarly enabled systems and devices.

When mobile device 600 is used as a UE, protocol stacks 646 include processes for operating as described in mobile telecommunications system user equipment.

EXTENSIONS AND ALTERNATIVES

In the foregoing specification, the approach has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method, when implemented in a device, comprising:
    when the device is operating on a first frequency in a connected mode state, the device detecting at least one condition for transitioning out of the connected mode state;
    selecting the first frequency and performing a first attempt to camp on a cell with the first frequency in response to the condition having been detected;
    determining that the first attempt to camp on the cell has failed;
    in response to the first attempt to camp having failed, identifying an indication that the first frequency is not allowed for camping;
    marking the first frequency with an indicium indicating a camping failure in response to identifying the indication;
    adding the first frequency to a first set of frequencies marked with an indicium indicating a camping failure in response to the frequency having been marked;
    after the first frequency has been marked, analyzing a plurality of frequencies, the plurality of frequencies comprising the first set of frequencies and a second set of frequencies, wherein each frequency in the second set of frequencies is not marked with an indicium indicating a camping failure;
    determining, based on the plurality of frequencies being analyzed, that each of the second set of frequencies have been previously used for a subsequent camping attempt in response to the first attempt to camp having failed;
    selecting a second frequency from the set of first frequencies based on each of the second set of frequencies have been previously used for a subsequent camping attempt in response to the first attempt to camp having failed, wherein the second frequency from the set of first frequencies is still marked with the indicium indicating a camping failure when selected; and
    performing a second attempt to camp on a cell with the second frequency.

2. The method of claim 1, in which marking the first frequency comprises:
    storing an indicium in relation to the first frequency.

3. The method of claim 1, in which marking the first frequency comprises
    storing an indicium in relation to the first frequency, and in which the indicium comprises a penalty for future camping attempts on the first frequency.

4. The method of claim 2, in which
    when there are one or more different frequencies for attempting to camp on a cell, attempting to camp on a cell using a frequency dependent upon the indicium.

5. The method of claim 2, in which
    when there are one or more different frequencies for attempting to camp on a cell and when the device has not received information relating to a frequency of camping to use, attempting to camp on a cell using a frequency dependent upon the indicium.

6. The method of claim 2, in which
    when there are one or more different frequencies for attempting to camp on a cell, attempting to camp on a cell using a frequency dependent upon the indicium where attempting to camp on the cell comprises
    attempting to camp using one or more of the different frequencies in preference to the frequency.

7. The method of claim 2, in which
    when there are one or more different frequencies for attempting to camp on a cell and when the device has not received information relating to a frequency of camping to use:
        attempting to camp on a cell using a frequency dependent upon the indicium,
    wherein attempting to camp on the cell comprises
        attempting to camp using one or more of the different frequencies in preference to the frequency.

8. The method of claim 2, in which
    when there are one or more different frequencies for attempting to camp on a cell, attempting to camp on a cell using a frequency dependent upon the indicium.

9. The method of claim 2, in which the indicium comprises one of:
    an indication of information received by the device that the cell is barred for camping; and
    a failure to receive information required for camping on the cell.

10. The method of claim 2, in which
    when the device camps on a cell on a frequency with a related indicium,
        removing the indicium.

11. The method of claim 1, in which the device is operable in a High Speed Packet Access Operation in which separate frequencies are allocated for connected mode operation, and idle mode operation.

12. The method of claim 1, wherein transitioning out of the connected mode comprises transition to an idle mode.

13. The method of claim 1, in which the device attempts to camp on a cell based on one of:
  radio link failure;
  re-direction to circuit switched operation from Long Term Evolution (LTE) operation on direction of a network in which the device is operable, without the network indicating a frequency for the circuit switched operation; and
  in Global System for Mobile Communications-Edge Radio Access Network (GERAN) operation where a list of frequencies provided to the device for cell reselection or cell change does not indicate which of the frequencies in the list are for connected or idle mode operation.

14. The method of claim 1 in which the attempt to camp on the cell is part of an inter-Radio Access Technology (inter-RAT), or an intra-RAT transition.

15. A wireless telecommunications device comprising:
  a processor; and
  a memory having stored therein one or more routines executable by the processor, the one or more routines being adapted to operate so that when the wireless telecommunications device is operating on a first frequency in a connected mode state, the wireless telecommunications device
    detects at least one condition for transitioning out of the connected mode state;
    selects the first frequency and performs a first attempt to camp on a cell with the first frequency;
    determines that the first attempt to camp on the cell has failed;
    in response to the first attempt to camp having failed, identifies an indication that the first frequency is not allowed for camping;
    marks the frequency with an indicium indicating a camping failure in response to the indication being identified;
    after the frequency has been marked, adds the first frequency to a first set of frequencies marked with an indicium indicating a camping failure in response to the frequency having been marked;
    analyzes a plurality of frequencies, the plurality of frequencies comprising the first set of frequencies and a second set of frequencies comprising frequencies that are not marked with an indicium indicating a camping failure;
    determines, based on the plurality of frequencies being analyzed, that each of the second set of frequencies have been previously used for a subsequent camping attempt in response to the first attempt to camp having failed;
    selects a second frequency from the set of first frequencies based on the each of the second set of frequencies have been previously used for a subsequent camping attempt in response to the first attempt to camp having failed, wherein the second frequency from the set of first frequencies is still marked with the indicium indicating a camping failure when selected; and
    performs a second attempt to camp on a cell with the second frequency.

16. The device of claim 15, in which
  the one or more routines are adapted to operate to mark the first frequency by storing an indicium in relation to the first frequency.

17. The device of claim 15, in which the one or more routines are adapted to operate to mark the first frequency by
  storing an indicium in relation to the first frequency, and in which the indicium comprises a penalty for future camping attempts on the first frequency.

18. The device of claim 16, in which
  when there are one or more different frequencies for attempting to camp on a cell, the routines are adapted to operate to attempt to camp on a cell using a frequency dependent upon the indicium.

19. The device of claim 16, in which
  when there are one or more different frequencies for attempting to camp on a cell and when the device has not received information relating to a frequency of camping to use,
  the routines are adapted to operate to attempt to camp on a cell using a frequency dependent upon the indicium.

20. The device of claim 16, in which
  when there are one or more different frequencies for attempting to camp on a cell, the routines are adapted to operate to
  attempt to camp on a cell using a frequency dependent upon the indicium, and in which attempt to camp on the cell comprises
  attempt to camp using one or more of the different frequencies in preference to the frequency.

21. The device of claim 16, in which when there are one or more different frequencies for attempting to camp on a cell and when the device has not received information relating to a frequency of camping to use, the routines are adapted to operate
  attempt to camp on a cell using a frequency dependent upon the indicium; and
  in which the routines are adapted to operate to attempt to camp on a cell by using one or more of the different frequencies in preference to the frequency.

22. The device of claim 16, in which
  when there is one or more different frequencies for attempting to camp on a cell, the routines are adapted to operate to
  attempt to camp on a cell using a frequency dependent upon the indicium, where the routines are adapted to operate to
  attempt to camp on a cell by attempting to camp on a cell using a different frequency for a period.

23. The device of claim 16, in which the indicium comprises one of:
  an indication of information received by the device that the cell is barred for camping; and
  a failure to receive information required for camping on the cell.

24. The device of claim 16, in which
  when the device camps on a cell on a frequency with a related indicium, the routines are adapted to operate to remove the indicium.

25. The device of claim 15, in which the device is operable in a High Speed Packet Access Operation in which separate frequencies are allocated for connected mode operation, and idle mode operation.

26. The device of claim 15, wherein transitioning out of the connected mode comprises transitioning to an idle mode.

27. The device of claim 15, in which the device attempts to camp on a cell based on one of:

radio link failure;

re-direction to circuit switched operation from Long Term Evolution (LTE) operation on direction of a network in which the device is operable, without the network indicating a frequency for the circuit switched operation; and in Global System for Mobile Communications-Edge Radio Access Network (GERAN) operation where a list of frequencies provided to the device for cell reselection or cell change does not indicate which of the frequencies in the list are for connected or idle mode operation.

28. The device of claim 15 in which the attempt to camp on the cell is part of an inter-Radio Access Technology (inter-RAT), or an intra-RAT transition.

29. A non-transitory computer-readable medium having computer-executable instructions adapted to cause a device to perform the method of claim 1.

30. The method of claim 1, wherein the second frequency is selected based on determining that the second frequency in the first set of frequencies has not been previously used for a subsequent camping attempt in response to the first attempt to camp having failed.

* * * * *